C. G. LAMBERTON.
VEHICLE ROBE HOLDER.
APPLICATION FILED FEB. 21, 1918.
1,285,250.
Patented Nov. 19, 1918.
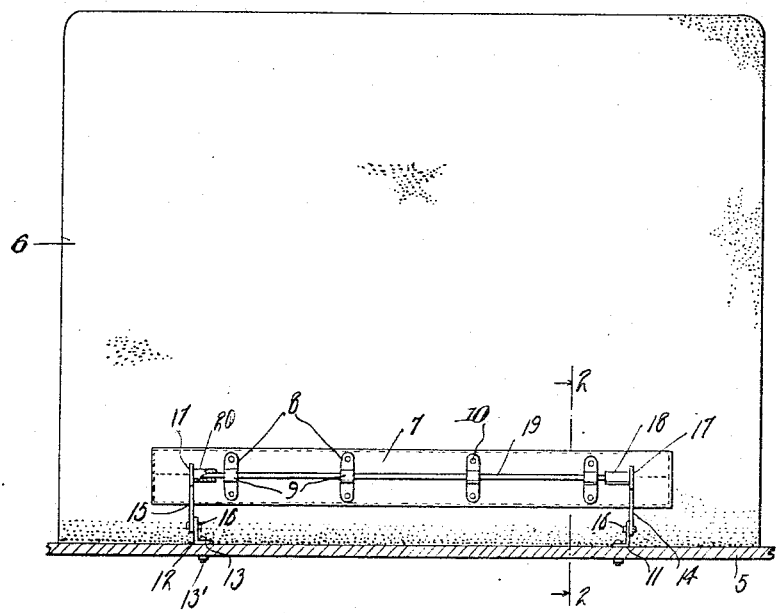
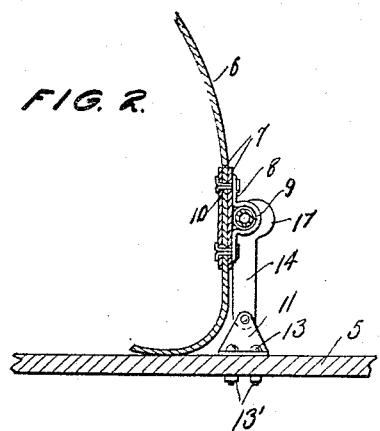
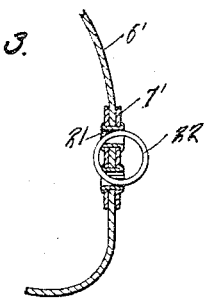
WITNESSES
W. C. Fielding
H. B. Vrooman
INVENTOR
Charles G. Lamberton
BY Richard Owen
ATTORNEY

UNITED STATES PATENT OFFICE.

CHARLES G. LAMBERTON, OF EAST AKRON, OHIO.

VEHICLE-ROBE HOLDER.

1,285,250.

Specification of Letters Patent.  Patented Nov. 19, 1918.

Application filed February 21, 1918. Serial No. 218,550.

*To all whom it may concern:*

Be it known that I, CHARLES G. LAMBERTON, a citizen of the United States, residing at East Akron, in the county of Summit and State of Ohio, have invented certain new and useful Improvements in Vehicle-Robe Holders, of which the following is a specification.

This invention is a vehicle robe holder and has special reference to protecting devices for holding the robe and preventing the stealing or fraudulent appropriation thereof.

Another object of this invention is the production of a vehicle robe holder which is intended to be connected to the robe for holding the same in firm engagement with the body of the vehicle in which the same may be positioned and thus prevent the unauthorized removal of the robe.

Another object of this invention is the production of a robe holder which includes a plurality of brackets connected to the floor of the vehicle, while bracket arms are connected to the brackets and support a rail, thus facilitating the connection of the robe to a rail for preventing the unauthorized removal of the robe.

A still further object of this invention is the production of a vehicle robe, wherein the robe is provided with a plurality of retaining elements thereon, thus facilitating the connection of these elements to the rail of the retaining device, thus preventing the removal of the robe.

This invention consists broadly in the provision of brackets secured to the floor of the vehicle, arms pivotally mounted upon these brackets and extending therefrom and having sleeves thereon, a rail having its ends carried within the sleeves, and a robe having straps or rings secured thereto and slidably mounted upon the rail, for preventing the removal of the robe.

With the above and other objects in view this invention consists of certain novel combinations, constructions and arrangement of parts, as will be hereinafter fully described and claimed.

One practical form of construction and assembly of the present invention will be hereinafter described and is illustrated in the accompanying drawing, in which—

Figure 1 is a front elevation of the robe holder, illustrating the same in use, portions of the same being partially broken away.

Fig. 2 is a vertical section taken on the line 2—2 of Fig. 1.

Fig. 3 is a vertical section through a portion of the robe, illustrating a slightly modified form of the attaching means.

Referring to the accompanying drawing by numerals, it will be seen that the device is used in connection with the ordinary floor 5 of a vehicle and is intended to hold the vehicle robe 6 against unauthorized removal.

In the preferred construction for the vehicle robe 6, it will be noted that the robe 6 is provided upon each side thereof with reinforcing strips 7 of any suitable material, such for instance as leather, or the like. The straps 8 are provided with bowed bodies 9, while the ends of the straps 8 are held in engagement with one of the strips 7 by the rigid or other securing means 10 passed through the straps and also through the strip and the robe 6, as illustrated clearly in Fig. 2. Thus it will be seen that rivets 10 will hold the straps, strips 7 and the robe 6 in firm engagement with each other. By referring to Fig. 1 it will be noted that the straps 8 are carried in spaced relation and it is obvious that the strips 7 may be of any desired length or that as many of the straps as desired may be employed.

The receiving brackets 11 and 12 are secured by bolts 13 and nuts 13' to the floor 5 of the vehicle. By referring to Fig. 1, it will be seen that these brackets 11 and 12 are carried in spaced relation and have the bracket arms 14 and 15 pivotally mounted thereon as shown at 16. The outer ends of the bracket arms 14 and 15 are provided with enlarged heads 17 for purposes to be hereinafter set forth. A sleeve 18 extends from the head 17 of the bracket arm 14 and has the rail 19 fixedly secured thereto in any suitable manner. The bracket arm 15 however, is provided with a sleeve 20 extending inwardly therefrom, as shown in Fig. 1 and the sleeve 20 is slidably mounted upon the remaining end of the rail 19.

When this device is to be used, the straps are secured upon the robe 6 in the manner hereinbefore set forth. The bracket 11 is then secured by the bolt and nut 13 and 13' to the floor 5 of the vehicle and the bracket arm 14, which has the rail 19 extending therefrom, is connected to the bracket 11. The robe 6 is then placed in position to permit the bodies 9 of the strap 8 to be passed over the end of the rail 19, causing the rail to be threaded through these straps. When this operation has been completed, the sleeve 20 of the bracket arm 15 is slipped onto the free end of the rail 19 and then the bracket 13 is bolted to the floor 5 of the vehicle for holding the strap from unauthorized removal from the rail 19. It will be noted that although the bracket arms 14 and 15 may swing downwardly toward the floor of the vehicle, the heads 17 thereof will rest upon the floor and thus hold the straps, the rail and the robe 6 from engagement with the floor. Thus these elements will be held from being accidentally injured or from accidental displacement when in use. When the occupant of the vehicle so desires, he may grip the robe and pull the same onto his lap, although it will be held from being pulled upwardly from the floor by the engagement of the holder hereinbefore set forth. When however, the party desires to remove the robe, it is necessary to first remove the nut 13' under the floor 5 of the vehicle and then the corresponding bolt 13 may be removed from the interior of the vehicle, thus allowing the bracket 12 and the bracket arm 15 to be removed and then permitting the robe to be moved from engagement with the rail 19.

By referring to the form illustrated in Fig. 3, it will be seen that the robe 6' is provided with the usual reinforcing strips 7'. These strips 7' are held in position upon the robe by the eyelets 21 passing therethrough and being bent upon the outer portions of the strip. These eyelets are carried in spaced relation and each pair of eyelets engages a ring 22. These rings 22 are positioned upon the eyelets in spaced relation similar to the manner in which the straps 8 are carried upon the strips 7 and in this way it is obvious the rings will be held in position to be slipped upon the rail 19 for holding the robe against displacement. The modified form resides in the substitution of the rings for the straps, although the operation of the structure is identical with the preferred form, since the retaining elements secured to the floor of the vehicle are the same in both forms of the invention.

Referring to the foregoing description, it will be seen that a device has been provided which will efficiently prevent the unauthorized removal or stealing of the vehicle robe, although the structure will not in any way interfere with the drawing of the robe over the lap of the occupant of the vehicle.

As only one form with a slight modification thereof has been illustrated and described, it is obvious that many minor detail changes may be made in the construction of the invention, without departing from the spirit of the device, as long as the changes do not exceed the scope of the invention as claimed.

What is claimed is:

1. In a device of the class described, the combination of a plurality of brackets, means for holding said brackets in engagement with a support, bracket arms pivotally mounted upon said brackets, sleeves carried by said bracket arms, a rail connected to said sleeves, a robe, and means connected to said robe and engaging said rail for holding the robe against removal.

2. In a device of the class described, the combinaton of a plurality of brackets, means for securing said brackets to a support, bracket arms pivotally mounted upon said support, and having enlarged heads on their outer ends, sleeves connected to said bracket arms adjacent one side of each end, a rail carried by said sleeves, a robe, means connected to said robe and engaging said rail, thus holding the robe against displacement and said bracket arms being adapted to swing downwardly to rest upon a support, at which time said heads will hold said rail, said robe and the securing means spaced from the support.

3. In a device of the class described, the combination of a robe, strips positioned upon said robe, eyelets passing through said strips and said robe for holding said strips in fixed positions, rings carried by said eyelets, and means passing through said rings for holding the robe upon a support.

4. In a device of the class described, the combination of a robe, strips positioned upon said robe, eyelets passing through said strips and said robe for holding said strips in fixed positions, rings carried by said eyelets, a rod removably passing through said rings and means connecting the ends of said rods for releasably holding the same against displacement, thus retaining said robe upon said rod, while one of said strips will constitute a bearing surface for preventing the wear of the rod upon said robe.

In testimony whereof I affix my signature in presence of two witnesses.

CHARLES G. LAMBERTON.

Witnesses:
F. W. SHERMAN,
L. L. KERSON.

Copies of this patent may be obtained for five cents each, by addressing the "Commissioner of Patents, Washington, D. C."